Feb. 9, 1954   L. A. MARIHART   2,668,487
AGRICULTURAL MACHINE AND HOEING DEVICE THEREFOR
Filed June 2, 1950
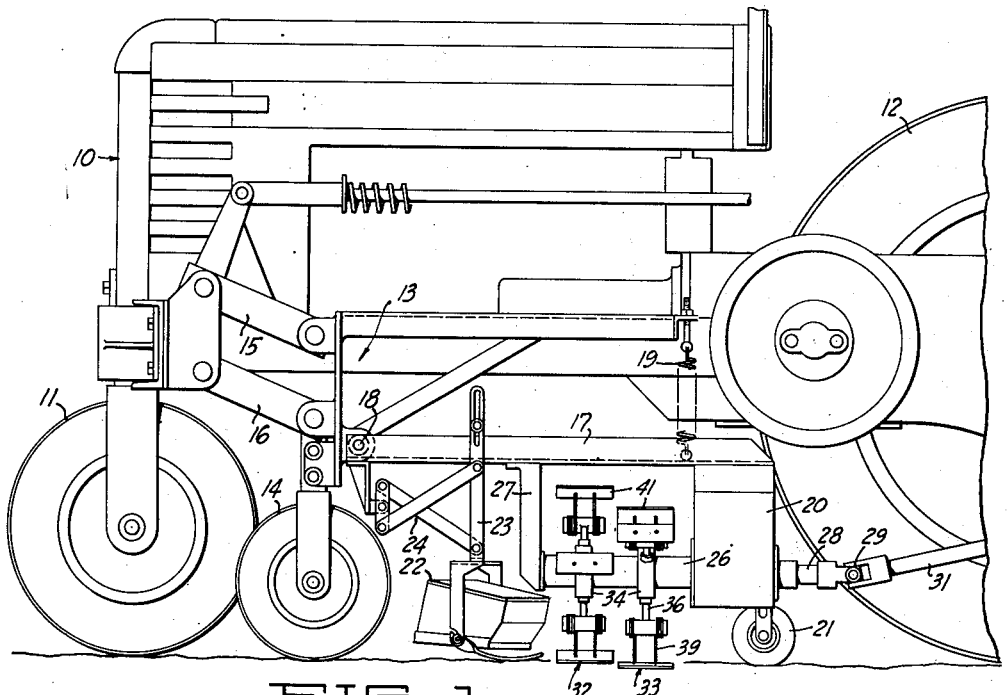
INVENTOR
Leo A. Marihart
BY
ATTORNEYS Patented Feb. 9, 1954

2,668,487

UNITED STATES PATENT OFFICE 2,668,487

AGRICULTURAL MACHINE AND HOEING DEVICE THEREFOR

Leo A. Marihart, Salinas, Calif., assignor to M. P. H. Industries, Palo Alto, Calif., a corporation of California Application June 2, 1950, Serial No. 165,760

3 Claims. (Cl. 97—38)

This invention relates generally to agricultural machines of the type making use of one or more mechanically driven hoeing devices, and particularly to machines capable of carrying out automatic thinning or weeding operations such as disclosed in my Patent No. 2,400,562.

In the agricultural machine disclosed in the above-mentioned patent rotary hoeing devices are provided which are driven through a solenoid released clutch, whereby they cut across a plant row to eradicate plants or weeds between those plants which it is desired to leave standing. Photoelectric means is employed to automatically operate the clutch. It has been found that the efficiency of operation and the general performance of such a machine is in part dependent upon the manner in which the hoeing devices pass through the soil. If the hoeing devices dig too deeply, too much soil may be displaced from the plant bed, and the root systems of the plants left standing may be injured. If the hoeing devices cut in too shallow a fashion, as for example to merely scrape across the surface of the ground, the plants which one desires to eradicate may not be cut below the crowns, whereby they will continue to grow. In addition to the foregoing it has been found desirable for the hoeing devices to operate over an area which extends for a substantial distance upon both sides of the plant row.

It is an object of the present invention to provide an improved machine of the above character, and in particular to provide hoeing means capable of improved and more efficient hoeing action.

It is another object of the invention to provide a hoeing means of the above character characterized in particular by the fact that it can be made to cut through a relatively shallow layer of the plant bed, and for a substantial distance on both sides of the plant row.

Additional objects of the invention will appear from the following description in which the preferred embodiment has been set forth in detail in conjunction with the accompanying drawing.

Referring to the drawing:

Figure 1 is a side elevational view illustrating a machine incorporating the present invention, and of the same general type as disclosed in my Patent 2,400,564.

Figure 2 is a front view illustrating a complete hoeing wheel.

Figure 3 is an enlarged detail illustrating the construction of one of the hoeing blades, and the arm means by which the blade is supported.

Figure 4 is an end view of the blade and arm means illustrated in Figure 3.

Figure 5 is a view showing the manner in which the hoeing means operates.

The machine illustrated in Figure 1 consists of an agricultural tractor 10 which is provided with the forward ground engaging steering wheel 11, and the rear driving wheels 12. A subframe 13 is carried by the adjustable ground engaging wheel 14. The subframe is attached to the frame of the tractor by the parallel links 15 and 16, thus permitting it to move in a vertical direction. A structure member 17 has its forward end pivotally attached at 18 to the subframe, and its rear end attached to the subframe by the tension or counterbalancing spring 19. A clutch housing 20 is attached to the rear end of the member 17, and a ground engaging wheel 21 is adjustably secured to the housing 20 and operates upon the ground surface.

A photoelectric box 22 is carried by the structure member 17, through the vertically adjustable bar 23 and the associated cross links 24.

To the rear of the photoelectric box 22, there is a rotatable shaft 26 which is journaled to the housing 20 and to a journal bracket 27 which extends downwardly from the structural member 17. The shaft 26 extends generally in a direction longitudinally of the vehicle, and parallel to the direction of movement along a plant row. A drive shaft 28 extends from the rear end of housing 20, and is attached through universal coupling 29 to the shaft 31. Shaft 31 is driven through suitable gearing which in turn may be driven by the ground engaging wheels 12, whereby the speed of rotation of shaft 31 is correlated with the forward speed of movement of the vehicle.

The shaft 26 carries a pair of hoeing wheels 32 and 33. These wheels can be identical in construction except that they are displaced angularly with respect to each other. Each wheel consists of a hub 34 (Figure 2), to which the rigid radially extending arm members 36 are attached. These members can be in the form of threaded rods to facilitate making adjustments in a radial direction. The outer ends of these rods carry the cross members 37, which can be hollow or tubular in form.

Each cross member 37 serves to mount a pair of coil springs 38, which in turn serve to support the arm members 39, and the cutting or hoeing blade 41. The coil springs 38 and the arm members 39 are preferably made integral and from suitable spring wire. Thus one end of a length of spring wire is coiled upon itself to form a coil 38, leaving a straight extending portion to form an arm member 39. The coil springs 38 are provided with diametrically extending end portions 42 which are loosely accommodated in slots 43 formed in the end of the member 37. Portions 42 are retained within these slots by suitable means such as the cotter pins 44.

The blades 41 can be made of flat pieces of suitable steel or steel alloy as illustrated and are secured to arm members 39 as by welding. The forward or advancing edges 46 are beveled and sharpened.

It is desirable that the arm members 36 and 39 normally extend at an angle to each other of considerably less than 180°. Thus by way of example the angle $a$ (Figure 5), can be of the order of 100°. The angle $b$ (Figure 5) formed between a radius drawn through the blade 41 and the extended plane of the blade should preferably be slightly less than 90°. Thus an angle of about 70° has been found suitable.

It will be evident that with the construction described above each blade is in effect supported from the two coil springs 38, whereby when force is applied to a blade, it can be moved a limited amount against the tension of springs 38, and without any corresponding rotation of shaft 26. Such movement occurs generally about a center corresponding to the axis of the coil springs 38. One component of such a movement is in a radial direction, and the other is circumferential.

The two hoeing wheels 32 and 33 are fixed to the shaft 26 and are so spaced longitudinally of the shaft that when the shaft rotates one-third of a revolution two adjacent longitudinally spaced hoeing blades 41 are caused to sweep through the plant bed, after which further rotation of the shaft is discontinued by release of the clutch. Figure 5 serves to illustrate how the blades 41 pass through the plant bed. If a blade were rigidly carried by the shaft, then its advancing cutting edge 46 would follow the circular path 47. This path would extend too deeply into the plant bed, assuming that the blade is to act over a substantial distance $c$. With the construction described, and particularly with use of the springs 38, the cutting edge actually passes through the ground surface along a path such as indicated by line 48. It will be noted that this path is nearly linear, and that it is only a short depth below the surface of the soil. The action just described is made possible by the fact that after a blade contacts the ground, it swings a limited angular amount about the center of the springs 38 whereby it is dragged through the ground without following the circular path 47, and in effect maintaining a substantially constant depth of cut for the entire width of the cut.

The action of the hoeing means can be adjusted to different soils by adjusting the wheel 21 relative to member 17. Thus for the harder soils wheel 21 can be adjusted to lower member 17 and the shaft 26 toward the ground, thus causing greater tension to be applied to the coils 38 whereby the blades have the desired cutting and hoeing action. For the more friable soils wheel 21 is adjusted to raise member 17 and shaft 26. With such adjustments the depth of cut can be kept to an optimum value for both hard and friable soils.

It will be evident from the above that I have provided hoeing means which is particularly advantageous for use with agricultural machines of the type disclosed in said Patent 2,400,562. A shallow regulated cut for the hoeing blades makes for efficient eradication of plants in thinning operations, and also for weeding operations which may follow thinning. The blades can be caused to cut at an optimum depth below the surface of the soil, whereby the cut is deep enough to properly eradicate plants and weeds by severing their growth below the crowns, but not sufficiently deep to displace too much soil or to injure the root system of plants left standing. In addition to the foregoing the hoeing devices can be made to cut over a substantial area extending laterally of the plant row.

In addition to the desirable features pointed out above, my construction facilitates making repair or replacements of damaged hoeing blades. To remove a hoeing blade it is only necessary to remove the cotter pins 44, after which the coils 38 are removed from the tubular member 37 by springing the members 39.

I claim:

1. In an agricultural machine for performing hoeing operations on plant beds, a shaft carried by the machine and extending longitudinally in the direction of movement thereof, said shaft being adapted to be rotated for performing hoeing operations, a hub carried by the shaft, a rigid arm member carried by the hub, and extending outwardly in a general radial direction, a rigid cross member secured to the outer end of said arm and extending parallel to the axis of the shaft, a pair of coil springs mounted upon the end portions of said cross member, one end of each coil spring being anchored to the cross member, the other ends of said coil springs being extended parallel to each other to form a second arm, said second arm extending outwardly with respect to the shaft and rearwardly with respect to the direction of rotation, and a ground hoeing blade secured to the outer extremity of said second arm, said blade being movable in both radial and circumferential directions against the urge of said coil springs when said blade is disposed to dig across a plant bed upon rotation of the shaft.

2. In an agricultural machine for performing hoeing operations on plant beds, a shaft carried by the machine and extending longitudinally of the direction of movement thereof, said shaft being adapted to be rotated for performing hoeing operations, a hub carried by the shaft, a rigid arm carried by the hub and extending outwardly in a general radial direction, said arm including a rigid coil mounting member secured to its outer end and extending generally parallel to the axis of the shaft, a coil spring mounted on said coil mounting member on an axis generally parallel to the axis of the shaft and with its convolutions embracing said coil mounting member, one end of the coil spring being secured to the arm, another arm member secured to the free end of the coil spring and extending outwardly with respect to the shaft and rearwardly with respect to the direction of the rotation of the shaft and a ground hoeing blade secured to the outer extremity of said last named arm member, said blade being movable in both radial and circumferential directions against the urge of said coil spring when the blade is caused to dig across a bed upon rotation of the shaft.

3. In an agricultural machine for performing hoeing operations on plant beds, a shaft carried by the machine and extending longitudinally of the direction of movement thereof, said shaft being adapted to be rotated for performing hoeing operations, a hub carried by the shaft, a rigid arm carried by the hub and extending outwardly in a general radial direction, said arm including a rigid coil mounting member secured to the outer end of the arm, a pair of coil springs mounted on said coil mounting member on a common axis which is generally parallel to the axis of the shaft, and with their convolutions embracing said mounting member, one end of each coil spring being anchored to the arm, another arm member secured to the free ends of the two coil springs and extending outwardly with respect to the shaft and rearwardly with respect to the direction of rotation, and a ground hoeing blade secured to the outer extremity of said last arm, said blade being movable in both radial and circumferential directions against the urge of said coil springs, and about the axis of the same, when the blade is caused to dig across a bed upon rotation of the shaft.

LEO A. MARIHART.

References Cited in the file of this patent

UNITED STATES PATENTS

| Number | Name | Date |
|---|---|---|
| 977,162 | Briscoe | Nov. 29, 1910 |
| 1,115,425 | Goodrum | Oct. 27, 1914 |
| 1,365,342 | Rainey | Jan. 11, 1921 |

FOREIGN PATENTS

| Number | Country | Date |
|---|---|---|
| 26,343 | Great Britain | Nov. 16, 1912 |